United States Patent [19]

Moorhead, Jr.

[11] 3,819,117

[45] June 25, 1974

[54] THRUST VECTOR — JET INTERACTION VEHICLE CONTROL SYSTEM

[75] Inventor: Seth B. Moorhead, Jr., Orlando, Fla.

[73] Assignee: Martin Marietta Corporation, New York, N.Y.

[22] Filed: May 25, 1970

[21] Appl. No.: 48,634

[52] U.S. Cl. ............................ 239/265.23, 251/309
[51] Int. Cl. ............................................. B63h 25/46
[58] Field of Search ....... 239/265.23; 251/311, 314, 251/309; 137/625–647

[56] References Cited
UNITED STATES PATENTS

| 3,132,478 | 5/1964 | Thielman | 239/265.23 |
| 3,133,723 | 5/1964 | Goldman et al. | 251/309 |
| 3,255,971 | 6/1966 | Widell | 239/265.23 |

*Primary Examiner*—Samuel Feinberg
*Attorney, Agent, or Firm*—Julian C. Renfro; Gay Chin

[57] ABSTRACT

A control system for a high speed rocket powered vehicle involving the use of a valve arrangement in which hot gases are received from the motor, and selectively ported overboard or into the rocket nozzle in order to provide maneuvering or vectoring control for the vehicle. In a preferred embodiment, at least one pair of oppositely disposed valves is utilized, with the movable portions of the valves arranged to be relatedly movable such that the vectoring forces provided by the valves are additive. My valves have a neutral position in which no maneuvering forces are generated, with an inherent fail-safe design being involved such that catastrophic maneuvers are prevented in the event control power is lost. Also, inasmuch as my valves do not shut off the hot gas flow, the rocket motor chamber pressure desirably does not fluctuate. Advantageously, the valve construction taught herein can withstand the hot erosive gases emanating from a solid fuel rocket.

16 Claims, 5 Drawing Figures

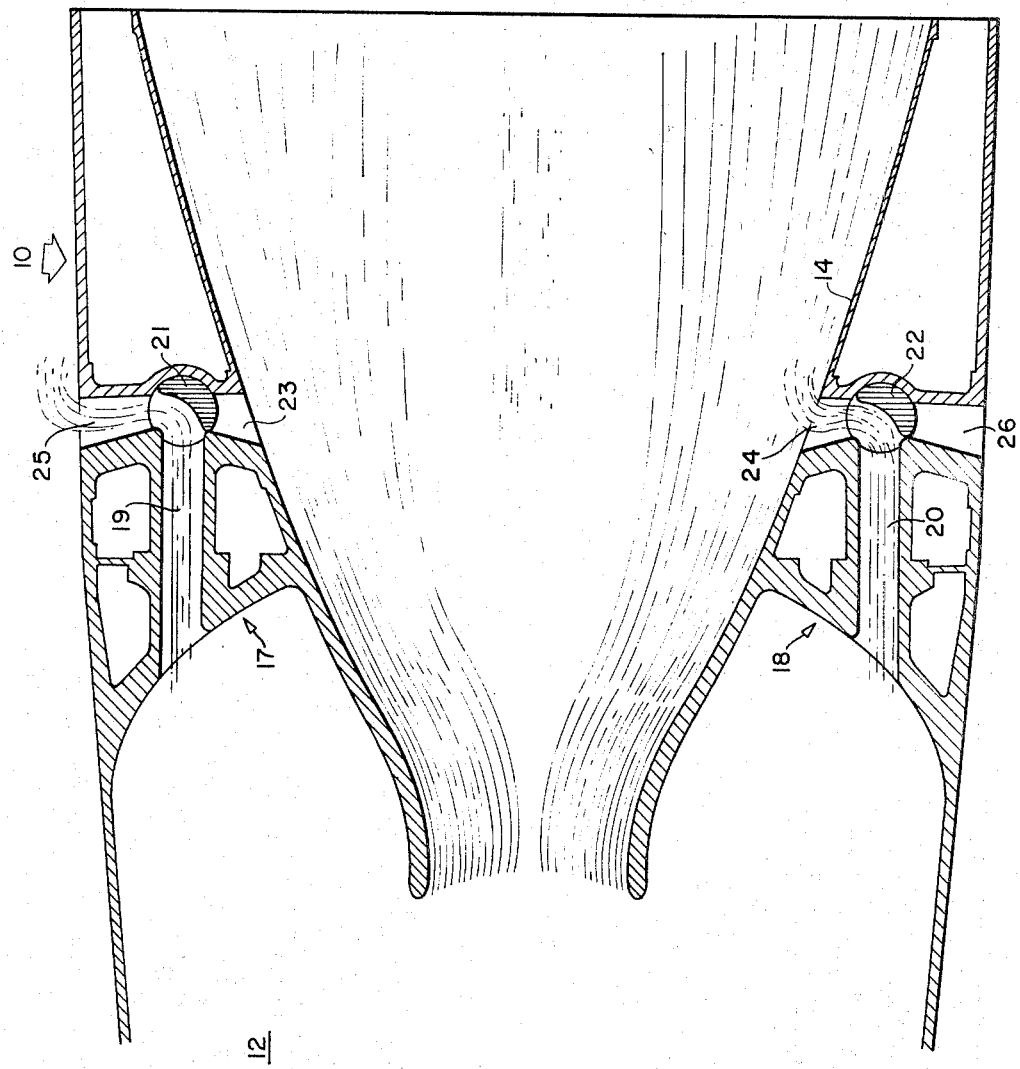

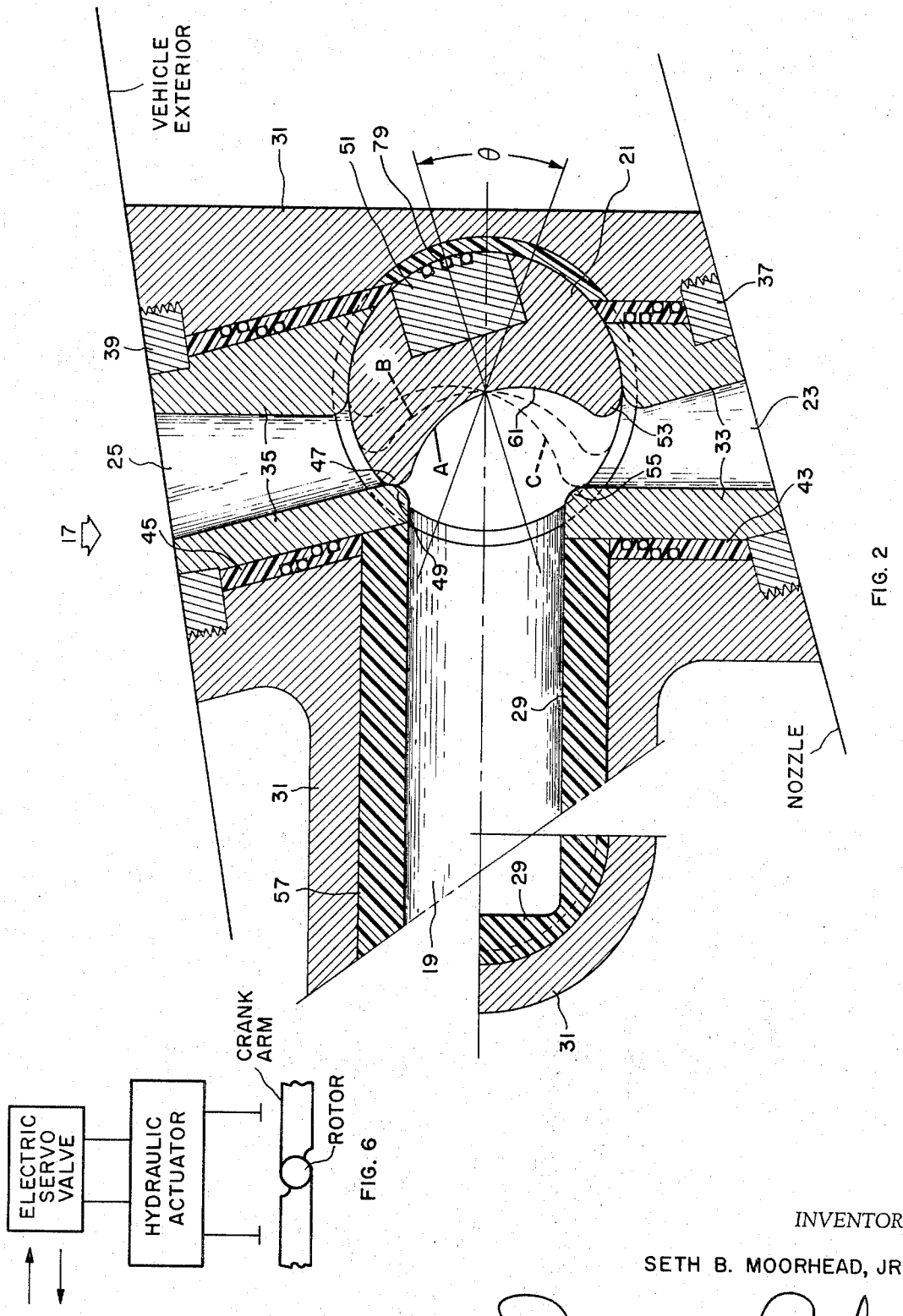

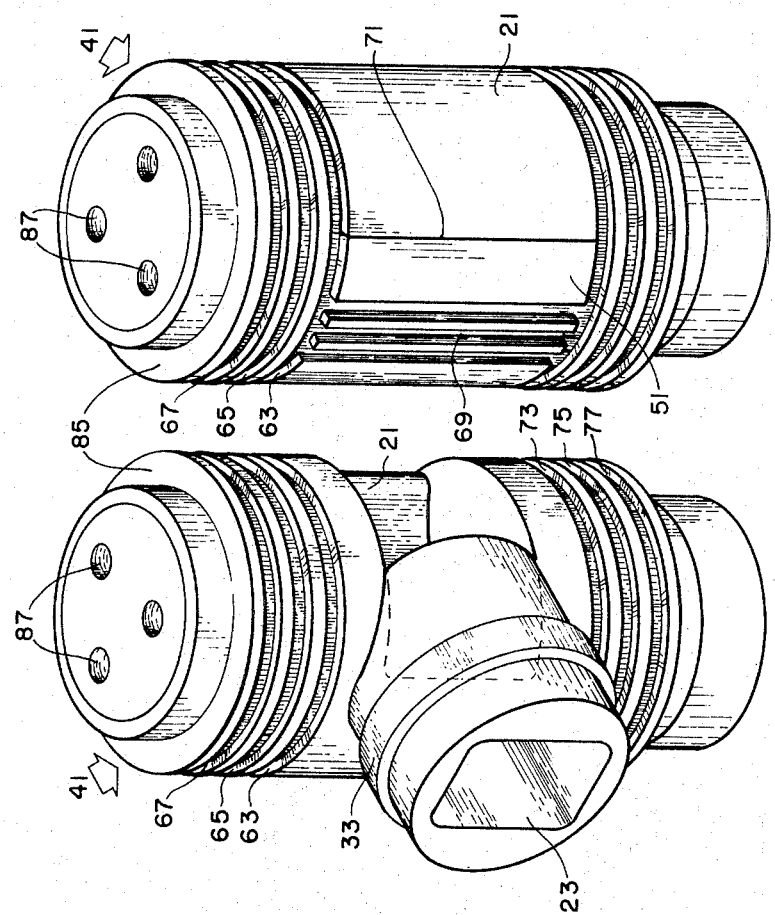

THRUST VECTOR — JET INTERACTION VEHICLE CONTROL SYSTEM

This invention relates to a control system for a high speed vehicle, and more particularly to a control valve assembly that can be effectively utilized for controlling the flight of a solid fuel rocket missile.

In the past, it has been known to control and direct the flight of solid fuel rockets by various means, such as by placing graphite vanes in the rocket nozzle, with the controlled movements of the vanes serving to provide maneuver or vector forces. However, because of weight, drag, erosion and required power, these vanes were very inefficient, and for this and other reasons industry gradually went to thrust vector control systems utilizing various fluids such as freon that are selectively injected into the rocket nozzle so as to provide maneuver forces. Obviously, the weight of this supplemental fluid for control and the volume necessary for tankage tended to unduly limit the range and maneuverability of the missile and a better solution was sought.

However, in dealing with control systems for a solid fuel rocket, many special problems are present, such as the fact that the gases emanating from the rocket are highly erosive and often are at a temperature in the vicinity of 6,000°F. Many have tried to tap off some of the motor gases to use them in lieu of supplemental fluid for control, but these attempts have heretofore been unsuccessful due to inadequate designs and improper material selections, and this fact plus the presence of highly erosive particles greatly shortened the life of any valve and ducting system used for controlling such gases.

The valve problem is of course intensified by the presence of another factor inherently involved in solid fuel rocketry, and that is the high accelerations that are present. The take-off acceleration for some solid fuel rockets involves 80 to 90 G's, and maneuver accelerations may be several hundred G's, and otherwise satisfactory pintle valves do not function properly in such an environment. Rotary valves were of course the solution to such a problem from the inertial standpoint, but prior art rotary valves were not successful from the materials and design standpoint.

These already severe problems were intensified by the fact that it is highly desirable for the rocket motor to operate at one pressure only, which is difficult to accomplish if a plurality of control valves, such as valves spaced around the main rocket nozzle, are to be caused to open and close on an as-needed basis for control of the missile, for this opening and closing is inconsistent with the maintenance of a steady chamber pressure. Moreover, the packaging space available around the rocket nozzle and the weight allowable for such an installation present severe design limitations.

In accordance with this invention, I have substantially solved these formidable problems by utilizing the rocket motor gases for selective injection into the main thrust nozzle or outboard, thus eliminating the extra tankage required by prior art control systems, while at the same time largely eliminating the valve problems that have heretofore plagued control system designers. I do not utilize valves which can be shut completely off, but rather use continuous flow rotary valves whose rotation in either direction away from a neutral or mid point serves to apportion hot gases from the motor either into the main thrust nozzle to achieve thrust vector control, or else overboard into the airstream in a direction essentially perpendicular to the airstream in order to produce jet interaction control. The continuous flow feature eliminates the damaging effect of motor pressure fluctuations. This arrangement is most efficient when these control valve are used in opposed pairs such that the total control force is apportioned between two valves located 180° apart. That is, while one valve is porting gas into the side of the main thrust nozzle producing a thrust vector control force, the corresponding valve on the other side of the missile is porting gas outboard and producing a complementing control force through interaction with the airstream.

It should be quickly noted that by utilizing in this manner a pair of valves for control rather than a single valve, the size of each valve necessary to pass the requisite amount of control fluid is reduced. Also, it amounts to a much more effective design in that two valves are operating simultaneously to bring about control, rather than the prior art arrangement in which the valve opposite an active valve is closed off and hence not contributing to control the flight of the missile.

Other facets of my invention include the features that in the event of failure of command signals to the rotary valves, they inherently move to a neutral position providing stable flight, rather than to a hard over position, which would result in a catastrophic maneuver, and the use of highly advantageous materials in the construction of the valves to handle the hot, erosive gases. Further, I utilize a novel compound O-ring arrangement of a type to withstand the high temperatures involved, and of a design that effectively prevents both leakage and undesirable bypass flow during all rotative movements.

It is therefore a principal object of my invention to provide a highly effective chamber bleed hot gas control system for a high speed rocket powered vehicle.

It is another object of my invention to provide a novel control system utilizing components durable enough to deal with hot erosive gases.

It is yet another object of my invention to provide a valving system usable with a rocket motor such that valving actions of the movable portions of the valves will not disturb the pressure existing in the rocket motor.

It is still another object of my invention to provide a valve design selectively functioning to cause rocket motor gases to be injected into the rocket nozzle for thrust vector control, to be ported overboard for jet interaction control, or to be apportioned between the nozzle and overboard when no maneuvering force is required.

It is yet still another object to provide a valve arrangement in which at least one pair of valves is disposed on substantially opposite sides of a rocket nozzle, with the movable portions of the valve pair being relatedly movable such that when one valve is operated to bring about thrust vector control, the opposite valve is operated to bring about jet interaction control, with the valves thus being utilized in an additive manner that is highly effective controlwise as well as weightwise.

These and other objects, features and advantages of this invention will be more apparent from a study of the appended drawings in which:

FIG. 1 is a sectional view of the aft portion of a rocket powered vehicle in accordance with this invention;

FIG. 2 is a sectional view to a larger scale of one of the valves illustrated in FIG. 1, with the movable portion of the valve being depicted in various operational positions;

FIG. 3 is a perspective view of the rotary valving assembly, showing in approximately a central portion thereof, the movable valve portion responsible for directing combustion products into one or the other outlet port;

FIG. 4 is a perspective view similar to FIG. 3, but showing the rotary valve assembly in a different position, in which portions of the novel seal member are visible;

FIG. 5 is a perspective view of the novel seal member; and

FIG. 6 is a schematic view of the control means for positioning the movable portion of the valve.

Turning to FIG. 1, it will there be seen that I have depicted the aft section 10 of a rocket powered vehicle, wherein fuel is burned in a motor chamber 12, with the products of combustion flowing outwardly from the motor traveling in a left-to-right manner in this figure. These products of combustion flow through a rocket nozzle 14 in so doing, which nozzle may be of conventional configuration.

Inasmuch as in accordance with this invention it is desired to laterally port in a selected manner, hot gases generated in the motor, so as to achieve maneuvering control, I provide a plurality of valve assemblies, such as assemblies 17 and 18, around the exterior of the rocket nozzle and internal of the outer skin of the rocket. Each valve in this embodiment is arranged to receive gases from the motor chamber, and to be controlled to direct those same gases either into the divergent portion of the rocket nozzle, overboard at a nearby location, or else to apportion the flow between the two. This is to say, gases for control purposes can be injected into the rocket nozzle to achieve thrust vector control, injected overboard to bring about jet interaction control, or else can be caused to flow simultaneously in some desired ratio to both locations. It should be noted that flow from a given valve into the rocket nozzle causes a maneuvering or vectoring force in one direction, and flow overboard from that valve in a direction that is essentially perpendicular to the airstream as depicted in FIG. 1, causes an opposite vectoring or steering force on the vehicle.

In FIG. 1, hot gases from the motor chamber 12 flow along inlet ports 19 and 20 of the valves 17 and 18, respectively, with the movable portions 21 and 22 of these valves being capable of moving so as to port or divert such gases into the divergent portion of the rocket nozzle through outlet ports 23 and 24, respectively, or else overboard through ports 25 and 26. The valves 17 and 18 are preferably relatedly movable rotary type valves, and in the event no maneuvering or vectoring force is needed at a given moment, the rotary valve portions 21 and 22 are movable to a neutral or null position in which the flow into the nozzle and outboard is proportioned so as to create a zero net lateral force.

In order to make optimum utilization of the control valve arrangement from the weight standpoint, in a preferred embodiment of this invention I utilize the valves in pairs, with the valve on one side of the rocket nozzle being arranged to be operated simultaneously with another valve on the opposite side of the rocket nozzle, with the vectoring force created by the one valve being additive with the vectoring force brought about by the other valve. In FIG. 1, for example, the movable portion 21 of valve assembly 17 has been moved to direct motor gases overboard through port 25 in a direction that is essentially perpendicular to the airstream, while at the same time, movable portion 22 of valve assembly 18 has been moved to direct motor gases into the rocket nozzle through port 24, with these actions producing a net, additive force serving to cause a reaction with respect to the C.G. of the vehicle such that the nose of the vehicle turns in the "upward" direction as viewed in FIG. 1. When in a given instance no vectoring force is required, the valves of each pair may of course be moved to a neutral position in which the flow is apportioned between the nozzle and the overboard locations, thus to cancel out any maneuvering force in the plane of such valves.

I am not limited to just one pair of valves, for in FIG. 1, valves 17 and 18 may be regarded as one of several possible pairs of relatedly operable valve assemblies. As will be apparent, another pair of relatedly movable valves may be disposed at 90° to the location of valves 17 and 18, which would of course then enable a vehicle in the nature of a rocket missile to be maneuvered both in pitch and yaw. It should be noted, however, that I am not to be limited to a small number of pairs of relatedly-movable valves, for obviously a larger number of pairs of valve assemblies may be utilized on a rocket powered vehicle in accordance with this invention. Also, it should be noted that it is possible to utilize an odd number of valve assemblies on the vehicle, in which the movement of a valve on one side of the vehicle would be joined in a maneuvering force effort by two valves at more or less opposite locations with respect to the one valve. However, typically two to four pairs of valve assemblies are used in accordance with this invention, with one valve of each pair 180° away from the other valve of that pair, and the plane of one pair of valves 90° away from the plane of another pair.

Turning now to FIG. 2, it will there be seen that I have depicted in cross section one of the valve assemblies, in this instance valve assembly 17, in which considerably more detail is revealed than was set forth in the simplified showing in accordance with FIG. 1. Combustion products from the motor entering the assembly 17 through inlet port 19 actually flow through an insert 29 that may be of graphite phenolic, which serves as a thermal insulator for the valve body 31, which typically is of steel. As shown in the partial cross section, insert 29 may have a substantially rectangular interior, and may have a substantially circular exterior in order that it can be conveniently bonded to a cylindrical hole in the valve body 31. The bond line is shown at 57.

The outlet ports 23 and 25, through which the combustion products are apportioned by the positioning of member 21, may likewise be defined by inserts, but in this instance I prefer to use inserts 33 and 35 of tungsten-copper. I also prefer to dispose insulating sleeves 43 and 45 around the inserts 33 and 35, with these sleeves being circular so as to conform to circular bores in the valve body 31, and to the circular exteriors of inserts 33 and 35. The insulating sleeve are preferably provided with inner and outer circular notches to receive high temperature O-rings, such that tight fits between the components are obtained, and no flow-by of gases can take place. The nozzle inserts and the surrounding sleeve are each retained in the desired positions in the valve body 31 by means of rings 37 and 39, whose external diameters are threaded, and arranged to be received in tapped holes in the valve body.

The movable portion 21 of the valve is of course a most vital portion of the assembly, and is arranged to accomplish its valving movements in a rotary manner, thus to be substantially insensitive to high G forces. The rotary portion 21 is of course additionally depicted in FIG. 3, wherein it is revealed to be a part of a much larger component 41 referred to as a rotary valving member. Part of FIG. 2 of course amounts to a cut through the valving member 41 at substantially its central portion.

In FIG. 2, it should be noted that the movable valve portion 21 is shown in a solid line position A in which it can direct the entire flow of hot motor gases entering inlet port 19 into port 23 leading into the rocket nozzle 14. In this instance, the rounded edge portion 47 of the movable valve portion 21 is in close contact with the rounded edge portion 49 of insert member 35, and this of course substantially prevents flow from entering port 25. The arcuate surface 61 of the member 21 serves to redirect the hot gases so that they flow smoothly into the intended port.

When the movable valve portion 21 has been moved to neutral position B shown in dashed lines in FIG. 2, the flow of hot gases along inlet port 19 is caused to be apportioned between the ports 23 and 25, so as to bring about the condition of no net maneuvering force referred to hereinbefore, whereas when the movable valve portion 21 is moved to position C as also indicated in dashed lines in FIG. 2, the entire hot gas flow is caused to enter the port 25 and be delivered overboard in a direction essentially perpendicular to the airstream as it flows past this port. In this latter instance, the edge 53 of the member 21 is closely adjacent the corner 55 of member 33.

It should be noted that the configuration involving the member 21 and the throats formed by 47 – 49 and 53 – 55 is such that the flow is never cut off, but rather a constant flow is allowed to take place through inlet port 19 (and 20), thus preventing pressure fluctuations in the chamber of motor 12. This is to say that the size of one throat is inversely proportional to the size of the opposite throat of the same valve assembly, and the further opening of one throat necessarily requires the proportional closing of the other throat. For fail safe purposes, I prefer to construct the geometry for the member 21 (and 22) such that upon failure of the control system, the valve members 21 and 22 will automatically be brought to the neutral or null position, thus avoiding a situation in which a catastropic maneuver will be bound to occur.

Although the high temperatures and the erosive nature of the gases impinging upon the surface 61 of the movable portion 21 of the valve dictate that latter portion be made of tungsten copper or some other suitable high temperature alloy, it is unnecessary that the entire rotary valving member 41 be made of such expensive, heavy material, and for that reason the bulk of the rotary valving member 41 may for example be made of aluminum, with upper and lower aluminum portions of the member 41 being interconnected by an aluminum portion 51 that extends between upper and lower portions of the member 41, at a location remote from the surface 61 of member 21, in the manner depicted in FIG. 2. FIG. 4 reveals a line of demarcation 71 between the aluminum portion 51 behind the surface 61, and the remainder of the midsection of rotary valving member 41, which is of tungsten-copper in the area indicated by numeral 21 in FIG. 3 and FIG. 4.

FIG. 3 also indicates thereon the general manner in which the tungsten-copper insert 33 is constructed, including the generally rectangular outlet port 23 disposed therein, and the manner in which the inner end of member 33 is disposed adjacent the midsection of rotary valving member 41 essentially at the location of movable valve member 21.

The upper portion of the member 41 is provided with a plurality of encircling grooves adapted to receive O-rings or the like, these grooves being identified as 63, 65 and 67. Similarly, the lower portion of member 41 is provided with encircling grooves 73, 75 and 77 for the same purpose.

FIG. 4 reveals that a plurality of longitudinally disposed grooves 69 are located in a manner serving to interconnect the grooves 63 and 73, and FIG. 5 reveals the compound O-ring arrangement 81 in which a number of parallel seal portions 79 are disposed between upper and lower O-ring portions 83 and 93. As will be obvious, the compound O-ring 81 is constructed to be placed upon the rotary valving member in such a manner that the longitudinally disposed portions 79 reside in the complementary grooves 69, in the general manner shown in FIG. 2. Preferably there may be three grooves 69 and three sealing portions 79, but I am of course not to be limited to this arrangement. Viton-A is preferred as a high temperature material to be used in the construction of member 81.

When the members 79 are disposed in the grooves 69, the upper O-ring portion 83 resides in groove 63, and lower O-ring portion 93 resides in groove 73, with this arrangement being such that the longitudinal sealing members 79 are caused to form an effective seal at a location substantially opposite the hot gases impinging upon arcuate surface 61, preventing such gases from flowing between the rotary valving member 41 and the inner surface of the valve body 31. As indicated in FIG. 2, the portion of the valve body contacted by the member 41 may be defined by a generally cylindrical insert of graphite phenolic bonded to the valve body 31. The various members are of course sized to allow for effective movements of member 41 to take place despite several expansions of the members due to a considerable amount of heating. I prefer to utilize several portions 79 in a form of series redundancy to allow for some loss by attrition. Similarly, I prefer to utilize more or less conventional O-rings of Viton-A in grooves 65, 67 and in grooves 75, 77, so that in the event of failure of some rings as a result of excessive temperature, other rings will remain effective and prevent the leakage of hot gases with attendant damage.

The member 41, and of course its counterparts in the other valve assemblies of the vehicle, may be movable by any of a number of mechanical or electrical means, but I prefer to utilize an arrangement in which a small electro-hydraulic servo-actuator is connected to move each rotary valving member or rotor 41. A closed loop electrical control circuit which includes an element arranged to sense valve position and/or movement is connected to the autopilot of the vehicle in such a manner that each rotary valving member is continuously driven to the proper position to provide the desired maneuvering force.

FIG. 6 schematically represents one form of control means for selectively regulating the position of a valve in accordance with this invention, which comprises an electric servo valve connected to an actuator, which may be a hydraulic actuator arranged to produce say 6,000 inch pounds of torque. The actuator is in turn linked by appropriate means to arms attached to the ends of rotor 41, of which the movable valve member 21 is of course a part.

In accordance with this invention, the rotary valving member 41 is mounted in the valve body 31 in such a manner that the movable valve portion 21 resides with respect to the inlet port 19 and the outlet ports 23 and 25 such that failure of power to the control means and accordingly the inability to regulate or position rotor element 41 as desired allows the gas to force the rotor element into a neutral or null state as represented by the dotted line configuration B of the movable valve portion 21 in FIG. 2. In this position, gas will flow from the main motor chamber 12 (FIG. 1) through the inlet port 19 and impinge directly on the arcuate surface 61 of the movable element 21, with the gas then being deflected substantially equally out through ports 23 and 25. In that the gas from main motor chamber 12 will now be exiting in equal proportions through both outlet ports 23 and 25 and consequently to both the interior and exterior of the missile, equal opposing forces will be reacting on the missile body.

It should now be apparent that in the preferred embodiment illustrated in FIG. 1, the valves are arranged such that when no control signal is being sent, substantially equal amounts of flow are ported through their pairs of outlets, so as then to provide substantially no net maneuvering force. Also, in this embodiment, the valves are utilized in oppositely-disposed pairs, with the movable portions of the valves being relatedly movable, such that when one valve is operated to deliver its flow into the nozzle 14, the opposite valve serves to deliver its flow overboard, thus increasing the vectoring force in the desired direction beyond the force obtained by one valve acting alone.

However, I am not to be limited to the foregoing, for I can utilize a control system in which all of the valves normally port their flow into the rocket nozzle, and at such time produce no net maneuvering force. In latter embodiment, the valves are arranged such that when a maneuvering force is required, the appropriate valve is operated to cause its output flow to be changed to a delivery overboard, while an oppositely-disposed valve continues to deliver its flow into the rocket nozzle, with both of the valves at such times thus providing additive maneuvering forces on the vehicle.

The angle θ in FIG. 2 reveals the extent of rotation involved in the member 21 moving between positions A and C. This amount of rotation can be 16½° for example.

Although I have mentioned that my design is particularly adapted for use with a solid fuel rocket, it should be borne in mind that it can of course also be utilized in conjunction with a liquid fuel rocket.

I prefer to utilize a bearing, such as a ball bearing, at each end of the rotary valving member or rotor, the outer races of which bearings are of course supported by the valve housing. FIGS. 3 and 4 show an end surface or shoulder 85 on one end of member 41, upon which one such bearing may be mounted. The use of bearings results in better alignments, and minimizes the required control forces for rotating the valving members.

Also shown in FIGS. 3 and 4 are a plurality of tapped holes 87, by the use of which the respective crank arm can be bolted to the member 41.

The O-ring material employed on rotor 41 can also be of certain silicone rubbers, or other high temperature elastomeric compounds rather than being limited to the aforementioned Viton-A.

I claim:

1. In a control system for a vehicle equipped with a rocket motor, a rocket nozzle arranged to carry rearwardly from the vehicle, the products of combustion from said rocket motor, and at least one valve in said vehicle, having an inlet port and a pair of outlet ports, said inlet port being connected to receive hot gases from said rocket motor, said valve having a movable portion for apportioning the flow of such gases between said outlet ports, one of said outlet ports being connected to said rocket nozzle, so that flow from said valve into said nozzle can cause thrust vector control in one direction with respect to said vehicle, and the other outlet port being connected overboard, substantially perpendicularly to an airstream flowing past the vehicle, such that flow exiting through latter outlet port causes jet interaction control with respect to said vehicle, but in a direction opposite said one direction.

2. The control system as defined in claim 1 in which said movable valve portion is arranged to deliver the entire flow entering its inlet port into either one or the other of said outlets, or to apportion such flow between the outlets, but not to cut off the flow entirely.

3. The control system as defined in claim 1 in which a pair of valves is utilized, disposed substantially on opposite sides of said nozzle, the movable portions of said valves being relatedly movable, so that when the movable portion of one valve is moved to cause thrust vector control, the movable portion of the other valve is moved to cause jet interaction control, thus to create a combined control force acting on said vehicle.

4. The control system as defined in claim 1 in which said vehicle is a missile, and two pairs of relatedly movable valves are utilized for control, with the plane of one of said pairs of valves being disposed 90° away from the plane of the other pair, and with the valve pair in each plane being relatedly movable, such that when one valve of a given plane is positioned so as to achieve thrust vector control by diverting flow into the rocket nozzle, the other valve of that plane is positioned to direct its flow overboard in essentially the opposite direction to said one direction, thus to bring about jet interaction control in such direction with respect to the center of gravity of the missile that it is additive with the force created by the thrust vector control, with the two pairs of valves making possible the controlling of the flight of the missile such that it can be effectively controlled in both pitch and yaw.

5. The control system as defined in claim 4 in which said missile is powered by a solid propellant rocket motor.

6. The control system as defined in claim 4 in which said missile is powered by a liquid propellant rocket motor.

7. In a control system for a vehicle equipped with a rocket motor, a rocket nozzle arranged to carry rearwardly from the vehicle, the products of combustion from said rocket motor, and a plurality of valves each having an inlet port and a pair of outlet ports, said inlet ports being connected to receive hot gases from said rocket motor, each valve having a movable portion for apportioning the flow of such gases between said outlet ports, one of the outlet ports of each of said valves being connected to said rocket nozzle, so that flow from the valve into said nozzle can cause thrust vector control in one direction, and the other outlet port of each valve being connected overboard, in essentially the opposite direction to said one port, so that flow exiting through such outlet port causes jet interaction control, latter amounting to a force in the direction opposite said one direction.

8. The control system as defined in claim 7 in which said movable valve portion is arranged to deliver the entire flow into either one or the other of said outlets, or to apportion such flow between the outlets, but not cut off the flow from a valve entirely.

9. The control system as defined in claim 7 in which said valves are utilized in oppositely spaced pairs, so that when the movable portion of one valve is moved to cause thrust vector control, the movable portion of the opposite valve is moved to cause jet interaction control, thus to cause a combined control force on the vehicle, causing it to turn in a desired direction.

10. The control system as defined in claim 7 in which said vehicle is a missile, and two pairs of relatedly movable valves are utilized, with the plane of one of said pairs of valves being disposed 90° away from the plane of the other pair, so that flight of the missle can thereby be controlled in pitch and yaw.

11. The control system as defined in claim 10 in which said missile is powered by a solid propellant rocket motor.

12. The control system as defined in claim 10 in which said missle is powered by a liquid propellant rocket motor.

13. The control system as defined in claim 7 in which each of said valves is arranged to normally port substantially equal amounts of flow through its pair of outlets, so as then to provide substantially no net vectoring force, said valves being utilized in oppositely-disposed pairs, with the movable portions of the valves being relatedly movable, such that when one valve is operated to deliver its flow into said nozzle, the opposite valve serves to deliver its flow overboard in what essentially amounts to the same direction with respect to the centerline of the missile, thus bringing about with respect to the center of gravity of the vehicle, the addition of forces, with the vectoring force on the missile thus being increased in the desired direction beyond the force obtained by one valve acting alone.

14. The control system as defined in claim 7 in which each of said valves is arranged to normally port its flow into said rocke nozzle, and at such times to produce no net vectoring force, said valves being arranged such that when a vectoring force is required, the appropriate valve is operated to cause its output flow to be changed to a delivery overboard in a direction essentially perpendicular to the airstream flowing past the vehicle, while an oppositely-disposed valve continues to deliver its flow into said rocket nozzle, with both of said valves at such times thus providing vectoring forces on said vehicle that are additive.

15. The control system as defined in claim 7 in which each of said movable valve portions is designed to be driven by the flow of hot gases to a neutral position in the event control power is lost, causing the flow of hot gases to be substantially equally divided between said outlet ports, thus amounting to a fail-safe condition in which no vectoring force is then asserted on the vehicle by said control system.

16. The control system as defined in claim 7 in which each of said valves utilizes a rotary valving member, of which said movable portion is a part, with said rotary valving member being selectively rotatable in order to bring about the directing, by said movable portion, of products of combustion into one or the other of said outlet ports, and a compound O-ring arrangement operatively disposed upon said rotary valving member, said O-ring arrangement involving a pair of O-rings joined by at least one longitudinally-disposed sealing member, said O-rings being disposed around said rotary valving member on either side of said movable portion so as to form circumferential seals, with said longitudinally-disposed sealing member being located at a position rotationally away from said movable portion, and serving as a longitudinal seal, preventing combustion products directed by said movable portion from also flowing around said rotary valving member.

* * * * *